United States Patent
Takenaka

(10) Patent No.: US 10,118,601 B2
(45) Date of Patent: Nov. 6, 2018

(54) BRAKE HOSE SUPPORT STRUCTURE OF VEHICLE

(71) Applicant: KABUSHIKI KAISHA TOYOTA JIDOSHOKKI, Aichi-ken (JP)

(72) Inventor: Takaaki Takenaka, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 15/487,899

(22) Filed: Apr. 14, 2017

(65) Prior Publication Data

US 2017/0305401 A1 Oct. 26, 2017

(30) Foreign Application Priority Data

Apr. 25, 2016 (JP) .................. 2016-087085

(51) Int. Cl.
| | |
|---|---|
| B60T 17/00 | (2006.01) |
| B60T 17/04 | (2006.01) |
| B62D 7/18 | (2006.01) |
| F16D 65/00 | (2006.01) |
| F16L 3/01 | (2006.01) |

(52) U.S. Cl.
CPC .......... B60T 17/046 (2013.01); B60T 17/043 (2013.01); B62D 7/18 (2013.01); F16D 65/0068 (2013.01); F16L 3/01 (2013.01)

(58) Field of Classification Search
CPC ....... B60T 17/046; B60T 17/043; B62D 7/18; F16D 65/0068; F16L 3/01
USPC .......................................................... 248/70
See application file for complete search history.

(56) References Cited

U.S. PATENT DOCUMENTS

| | | | | |
|---|---|---|---|---|
| 3,851,672 | A | * 12/1974 | De Vincent | ........... B60T 17/046 138/106 |
| 4,346,863 | A | * 8/1982 | Zeitrager | .............. B60T 17/046 248/56 |
| 4,482,135 | A | * 11/1984 | Ishida | .................. B60G 15/068 267/152 |

(Continued)

FOREIGN PATENT DOCUMENTS

| | | |
|---|---|---|
| EP | 1514790 | 3/2005 |
| JP | 54-139430 | 10/1979 |

(Continued)

OTHER PUBLICATIONS

Search Report issued in European Patent Office (EPO) Patent Application No. 17165701.8, dated Oct. 19, 2017.

(Continued)

*Primary Examiner* — Anita M King
(74) *Attorney, Agent, or Firm* — Greenblum & Bernstein, P.L.C.

(57) ABSTRACT

A brake hose support structure of a vehicle includes a brake hose through which pressure fluid is flowed between a pressure source mounted to the vehicle and a brake caliper of a disk brake device of the vehicle, and a hose support supporting the brake hose. The brake hose has a first end that is located adjacent to the pressure source, a second end that is located adjacent to the brake caliper, and a supporting portion that is disposed between the first and second ends. The hose support supports the brake hose at the supporting portion such that an axis of the brake hose extends parallel to a kingpin axis.

4 Claims, 10 Drawing Sheets

(56) References Cited

U.S. PATENT DOCUMENTS

| | | | |
|---|---|---|---|
| 4,505,354 A * | 3/1985 | Suzuki | B60T 17/046 |
| | | | 137/355 |
| 5,460,247 A | 10/1995 | Fouts | |
| 6,769,652 B1 * | 8/2004 | Capan | B60T 17/046 |
| | | | 248/65 |
| 6,830,075 B1 * | 12/2004 | McKinney | F16L 3/1236 |
| | | | 138/106 |
| 8,899,533 B2 * | 12/2014 | Lucas | B60T 17/046 |
| | | | 138/106 |
| 9,902,388 B2 * | 2/2018 | Heutchy | B62D 65/028 |
| 2005/0008282 A1 | 1/2005 | Sakurai et al. | |
| 2006/0049006 A1 | 3/2006 | Hasegawa et al. | |
| 2006/0170206 A1 * | 8/2006 | Mitsui | B60T 17/046 |
| | | | 280/797 |
| 2015/0210234 A1 | 7/2015 | Kuwabara et al. | |

FOREIGN PATENT DOCUMENTS

| | | |
|---|---|---|
| JP | 4-50560 | 4/1992 |
| JP | 2006-69437 | 3/2006 |
| JP | 2010-52536 | 3/2010 |
| KR | 20-1999-0015464 | 5/1999 |
| WO | 95/12074 | 5/1995 |

OTHER PUBLICATIONS

Office Action issued in Republic of Korea Counterpart Patent Appl. No. 10-2017-0051517, dated Jun. 28, 2018.

\* cited by examiner

BRAKE HOSE SUPPORT STRUCTURE OF VEHICLE

BACKGROUND OF THE INVENTION

The present invention relates to a brake hose support structure of a vehicle.

A brake hose is used in a vehicle so as to transmit the pressure of brake fluid from a master cylinder to a brake caliper of a disk brake device. The brake hose may be greatly swung when the wheels of the vehicles are steered or vibrated. Japanese Patent Application Publication 2006-69437 discloses a brake hose support structure that is designed to reduce swinging of a brake hose by using a bracket (support member) that fixes the brake hose at the kingpin axis thereby to reduce the distance between the fixed positions of the brake hose.

However, a problem may occur in the brake hose support structure disclosed in the above-cited Publication in which the brake hose is fixed by the support member such as bracket with the axis of the brake hose extending across the kingpin axis.

The end of the brake hose disposed adjacent to the brake caliper moves along an arc with the rotation of a knuckle that supports the wheel. When this end of the brake hose is moved to a position that is displaced substantially away from the axis of the fixed brake hose, there is a fear that an excessive stress may be applied to the brake hose because large bending occurs in the brake hose between the support portion and the knuckle.

The present invention, which has been made in light of above-described problems, is directed to providing a brake hose support structure of a vehicle that restricts bending of the brake hose.

SUMMARY OF THE INVENTION

In accordance with an aspect of the present invention, there is provided a brake hose support structure of a vehicle including a brake hose through which pressure fluid is flowed between a pressure source mounted to the vehicle and a brake caliper of a disk brake device of the vehicle, and a hose support supporting the brake hose. The brake hose has a first end that is located adjacent to the pressure source, a second end that is located adjacent to the brake caliper, and a supporting portion that is disposed between the first and second ends. The hose support supports the brake hose at the supporting portion such that an axis of the brake hose extends parallel to a kingpin axis.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
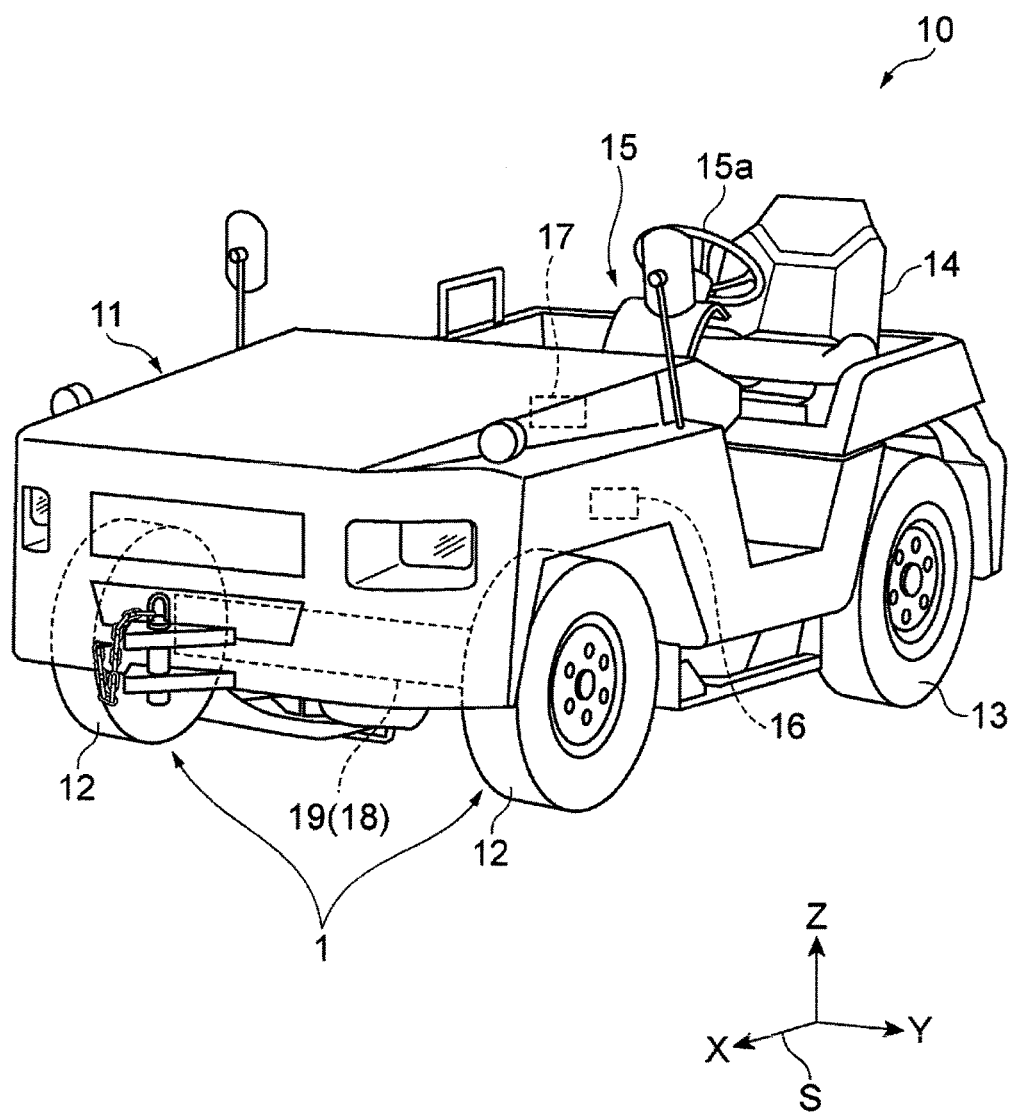
FIG. 1 is an illustration of a vehicle that is provided with a brake hose support structure according to an embodiment of the present invention.

The following will describe an embodiment of the present invention with reference to accompanying drawings. In the description of embodiments of the invention, like parts or elements are designated by like reference numerals and the description thereof will not be reiterated.

Referring to FIG. 1, there is shown a vehicle 10 in which a brake hose support structure 1 according to an embodiment of the present invention is mounted. In the following description, Cartesian coordinate system S may be used in which X, Y and Z axes indicate the front-rear, the left-right and the up-down directions of the vehicle 10, respectively, when the vehicle 10 is at a stop on a road surface.

As shown in FIG. 1, the vehicle 10 is a towing tractor that is used for transport of cargo at an airport. The vehicle 10 includes a vehicle body 11 that has at the lower front thereof a pair of front wheels 12 and at the lower rear thereof a pair of rear wheels 13. The vehicle 10 is a battery-powered towing tractor having a motor which is driven by electric power from a battery.

An operator seat 14 is arranged in the rear of the vehicle body 11 of the vehicle 10. A steering device 15 is disposed in front of the seat 14. The steering device 15 includes a steering wheel 15a that is operated by an operator of the vehicle 10 and a link mechanism (not shown) that is operated in accordance with the operation of the steering wheel 15a. The steering device 15 allows the paired front wheels 12 to be steered via the link mechanism in the direction in which the steering wheel 15a is turned by the operator of the vehicle 10.

Figure 2:
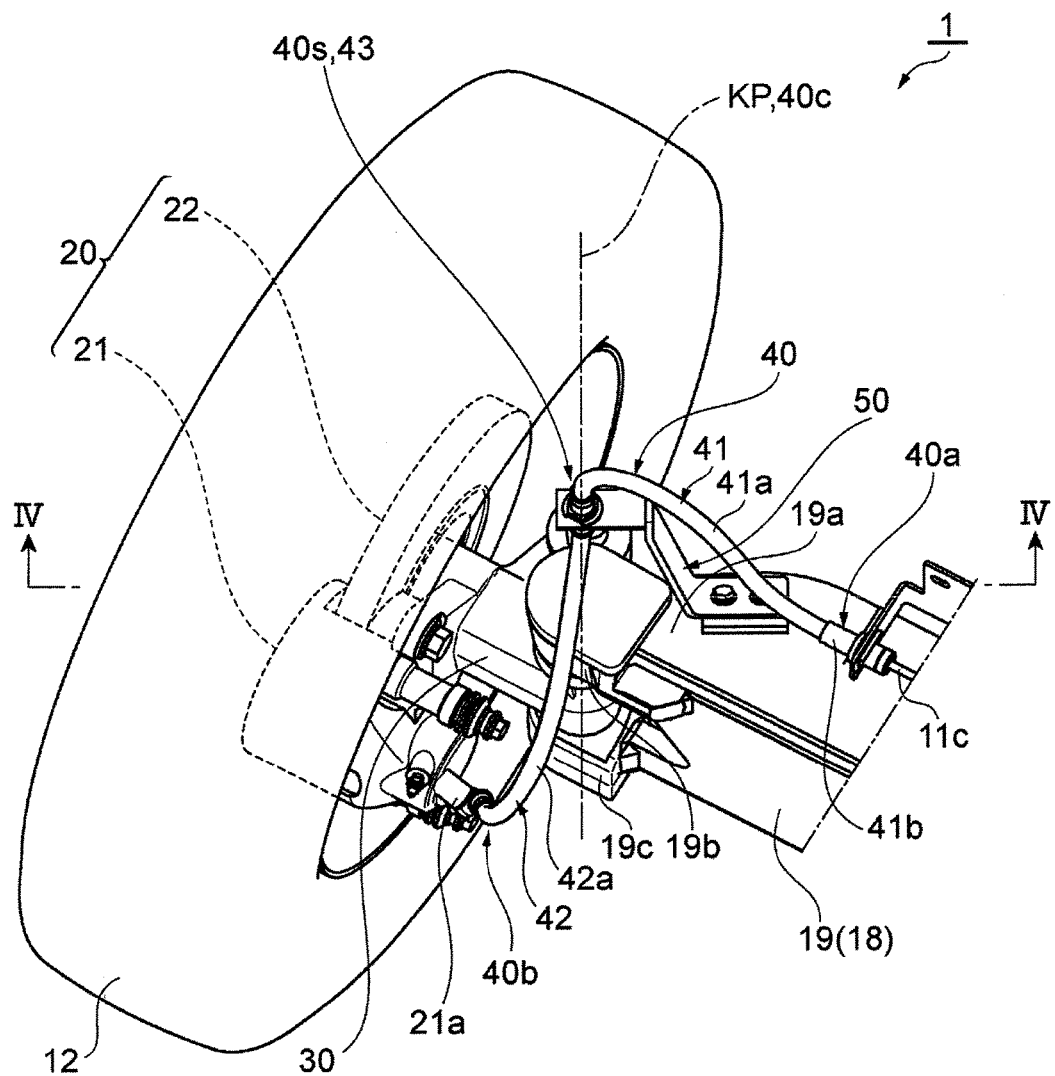
FIG. 2 is a perspective view of the brake hose support structure of FIG. 1.

An accelerator pedal (not shown) and a brake pedal 16 are disposed in the lower front of the seat 14. A master cylinder 17 is disposed frontward of the seat 14 in the vehicle body 11. The master cylinder 17 pressurizes brake fluid in accordance with the operation of the brake pedal 16. The master cylinder 17 and the brake fluid correspond to the pressure source and the pressure fluid, respectively, according to the present invention. Each of the paired front wheels 12 and the paired rear wheels 13 is provided with a brake device in which brake fluid oil serves as the working medium. As shown in FIG. 2, each front wheel 12 is provided with a disk brake device 20. Each rear wheel 13 is provided with a disk brake device or a drum brake device.

A suspension device 18 is disposed in the lower front of the vehicle 10. In the suspension device 18, a beam member 19 is suspended from the vehicle body 11 via a spring or a shock absorber (not shown). The beam member 19 extends in the vehicle width direction and connects the front wheels 12 which are disposed on the right and the left of the vehicle 10. The front wheels 12 are collectively suspended by the beam member 19. The beam member 19 extends in the direction of Y-axis.

Figure 3:
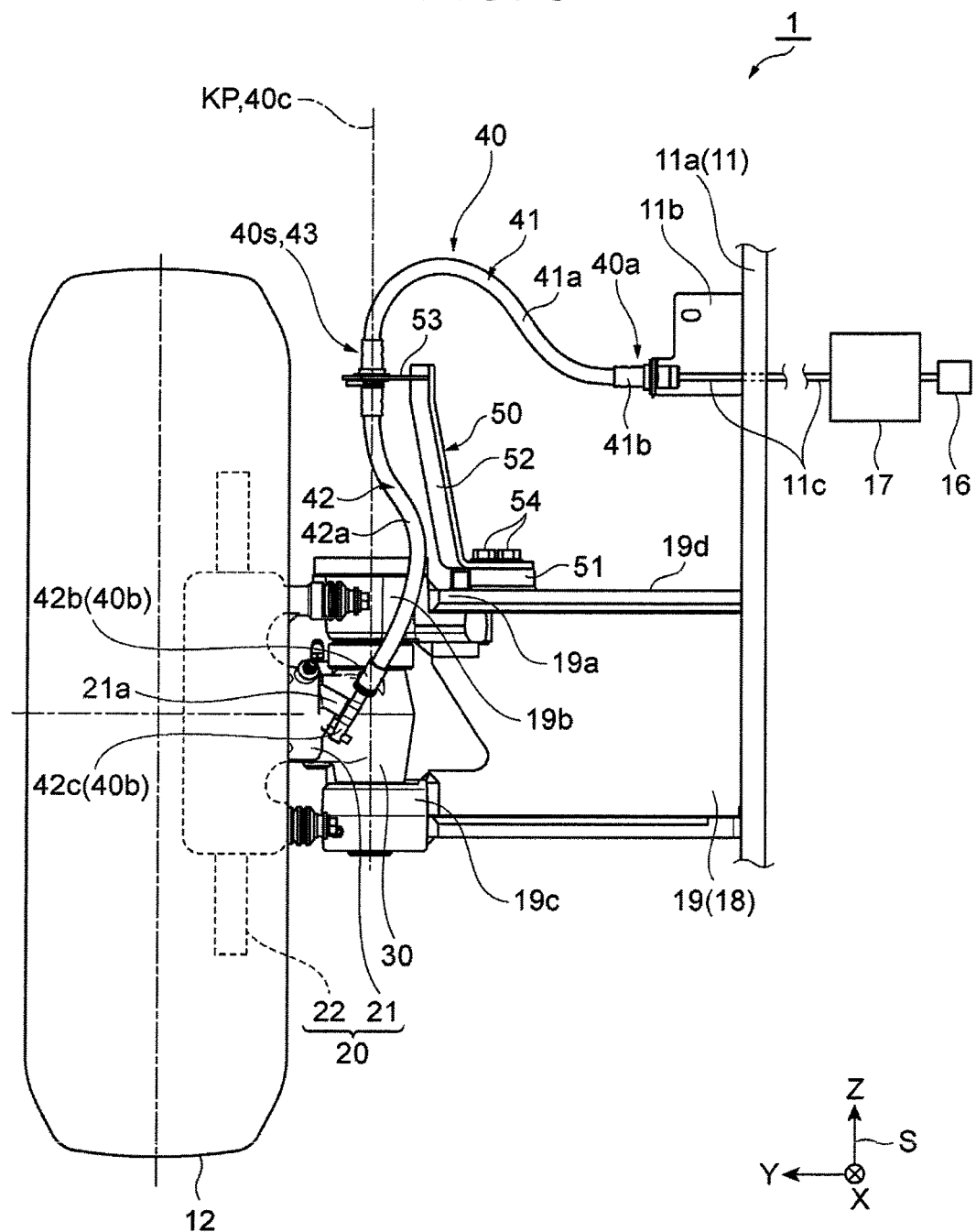
FIG. 3 is a side view of the brake hose support structure of FIG. 1.

As shown in FIGS. 2 and 3, a knuckle 30 is provided on each end of the beam member 19 to support the front wheel 12 and the disk brake device 20. Numeral 19a designates one end of the beam member 19 that is positioned at the front left of the vehicle 10.

The disk brake device 20 includes a brake caliper 21 that is fixed to the knuckle 30, a disk rotor 22 that is rotatable with the front wheel 12 and a pair of brake pads (not shown) that are disposed on the opposite sides of the disk rotor 22.

The brake caliper 21 holds the paired brake pads. The brake caliper 21 includes at least one piston (not shown) and an introduction portion 21a through which brake fluid is introduced from a brake hose 40, which will be described later. The piston is actuated by the pressure of brake fluid acting in the brake caliper 21 thereby to press the brake pads against the disk rotor 22.

The disk rotor 22 is disposed coaxially and rotatable with the front wheel 12. Pressure from the piston of the brake caliper 21 causes the brake pads to hold therebetween the disk rotor 22. Because the brake caliper 21 is fixed to the knuckle 30, the brake caliper 21 and the brake pads are not rotatable. Therefore, the rotation speed of the front wheel 12 is reduced with a reduction of the rotation speed of the disk rotor 22.

Figure 4:
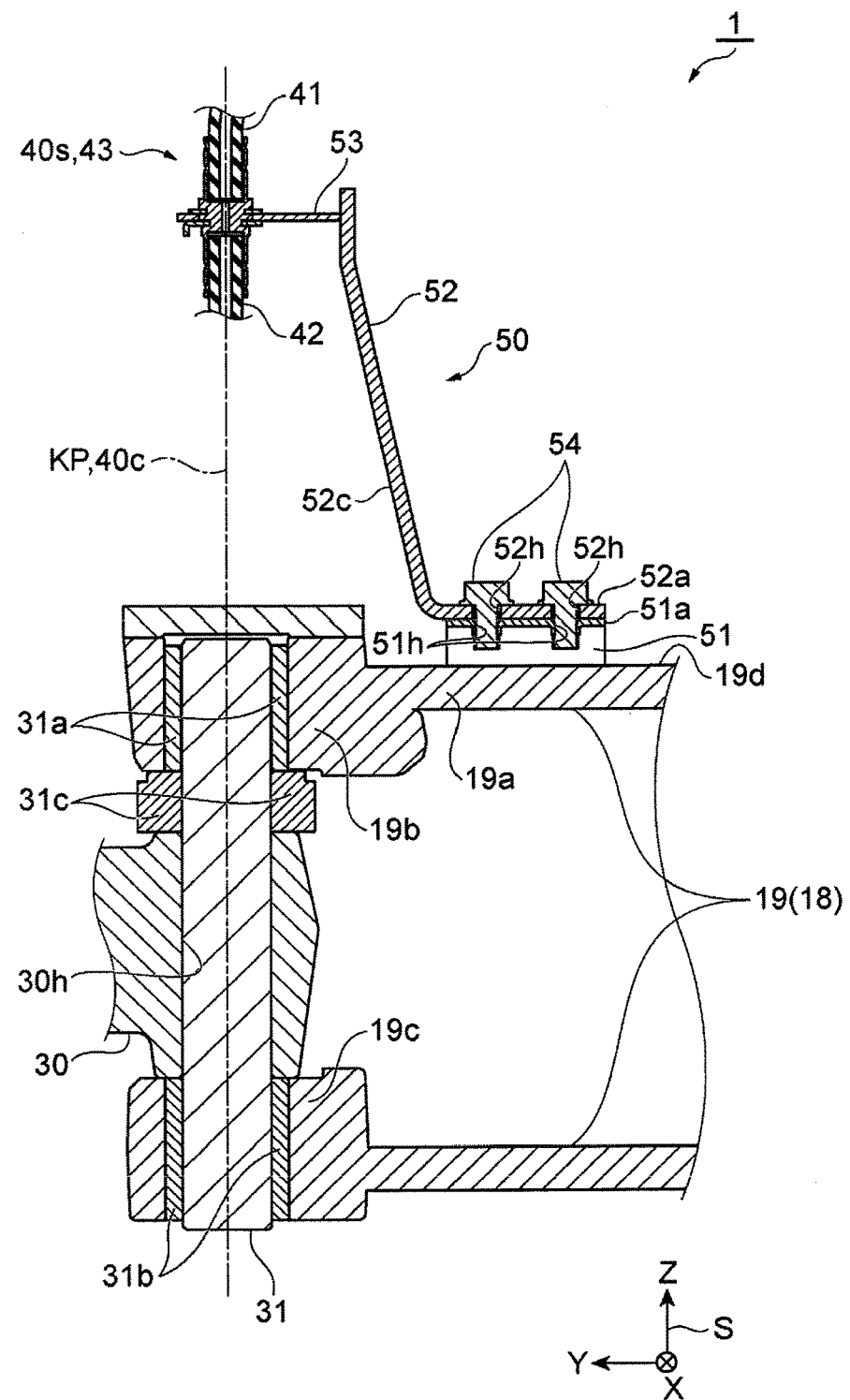
FIG. 4 is a cross-sectional view taken along line IV-IV of FIG. 2.

The knuckle 30 supports the front wheel 12 rotatably about its axis. In addition, the front wheel 12 is steerably supported by the knuckle 30. As shown in FIG. 4, the knuckle 30 has a pin hole 30h in which a kingpin 31 is fixedly inserted to rotate with the knuckle 30. The kingpin 31 is formed by a columnar metal and is press fitted in the pin hole 30h having a circular shape in cross-section. The kingpin 31 is disposed coaxially with the pin hole 30h.

The kingpin 31 is supported at the upper end thereof by a roller bearing 31a in the upper portion 19b of the beam member 19 and at the lower end thereof by a roller bearing 31b in the lower portion 19c of the beam member 19. A thrust bearing 31c is mounted on the kingpin 31 immediately below the roller bearing 31a so as to support the upward load from the front wheel 12. The knuckle 30 and the kingpin 31 are integrally rotatable about the kingpin axis KP. In the present embodiment, the kingpin 31 is supported by the upper portion 19b and the lower portion 19c of the beam member 19 so that the kingpin axis KP extends in the vertical direction (Z-axis direction) of the vehicle 10.

Figure 7:
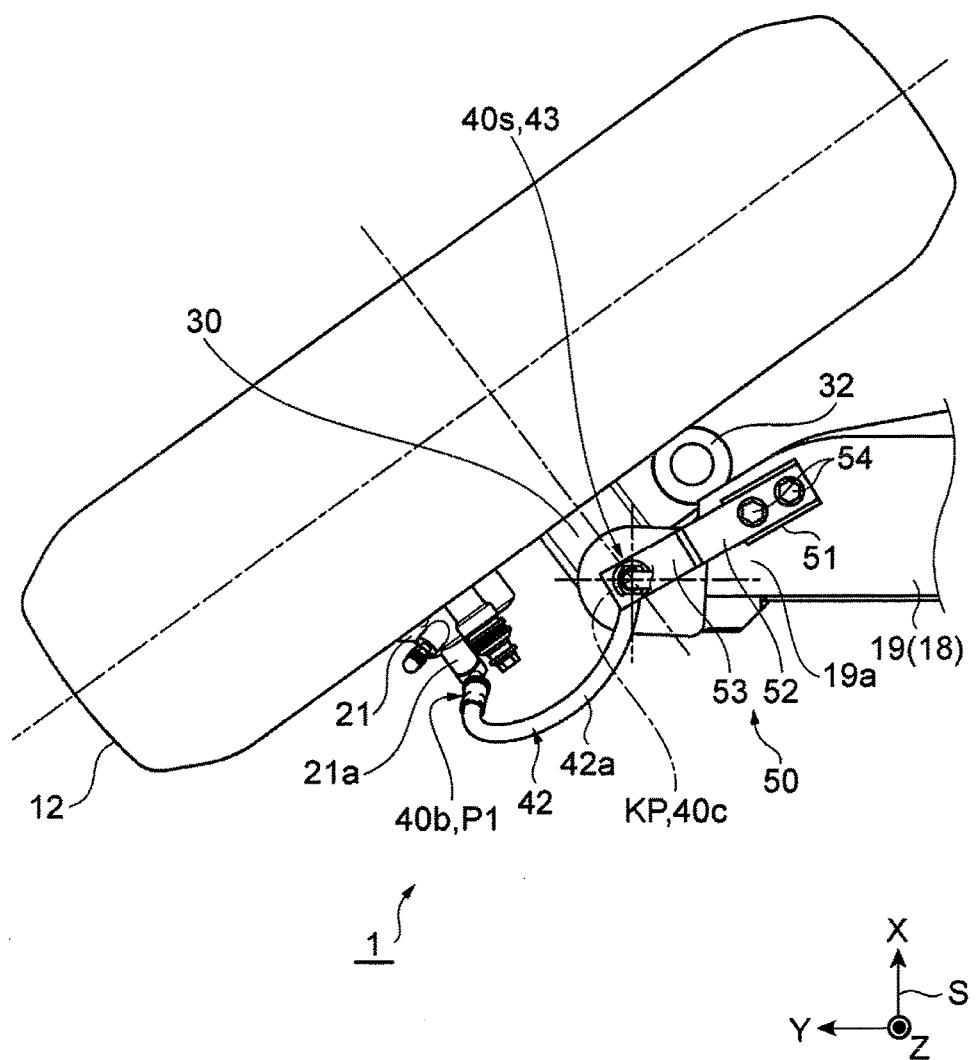
FIG. 7 is a plan view, showing a state in which a wheel of the vehicle is steered in clockwise direction to the steering limit angle as viewed from the top.
Figure 8:
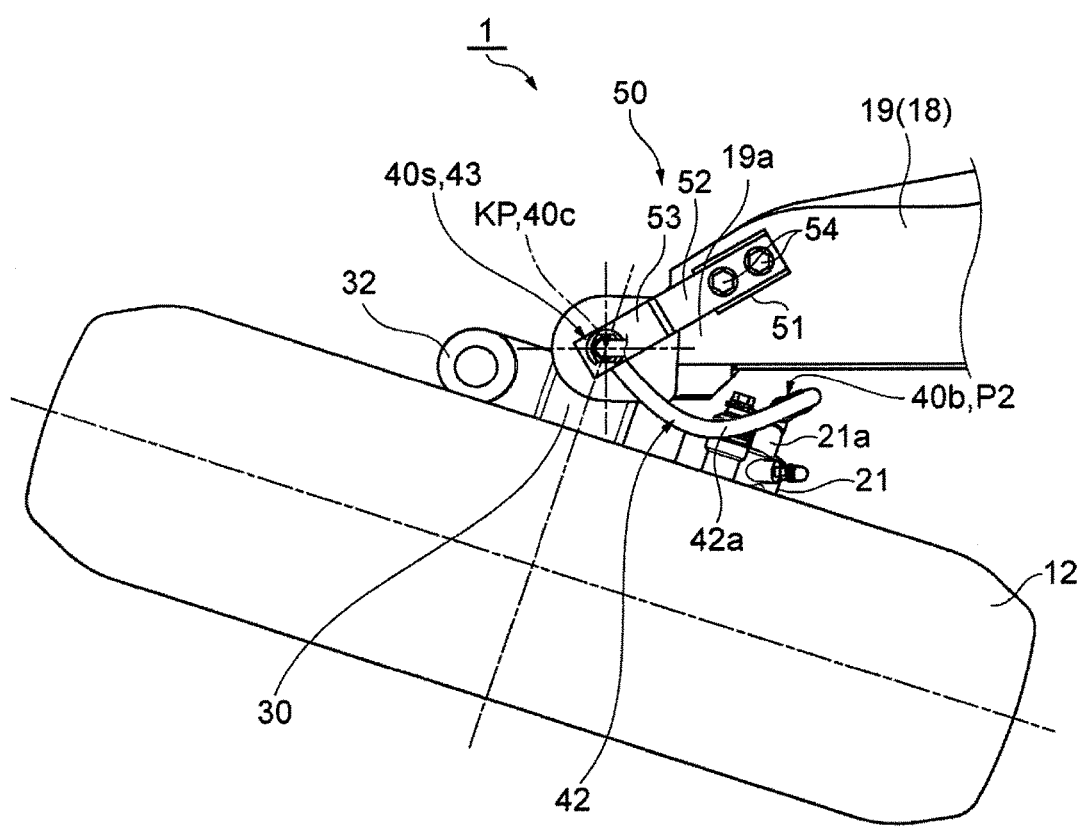
FIG. 8 is a plan view, showing a state in which the wheel of the vehicle is steered in counterclockwise direction to the steering limit angle as viewed from the top.
Figure 8:
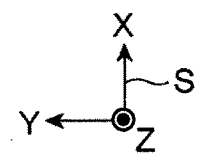

Referring to FIGS. 7 and 8, the knuckle 30 has an arm 32 extending in the direction that crosses the axis of the front wheel 12 and also the extending direction of the pin hole 30h. The arm 32 extends in the radial direction of the kingpin 31. The aforementioned link mechanism of the steering wheel 15a is mounted to the arm 32. The arm 32 is moved by the link mechanism that is allowed to move in the longitudinal direction of the beam member 19 in response to the operation of the steering wheel 15a, which causes the knuckle 30 to be turned about the kingpin axis KP.

The following will describe the brake hose support structure 1 in detail with reference to FIGS. 2, 3, 4, 7 and 8 in which the brake hose support structure 1 disposed adjacent to the front wheel 12 on the left side of the vehicle 10 is illustrated. Although the following description will focus on the brake hose support structure 1 for the front wheel 12 on the left side of the vehicle 10, the front wheel 12 on the right side of the vehicle 10 uses a substantially the same brake hose support structure 1.

Referring to FIG. 3, the brake hose support structure 1 includes the brake hose 40 through which brake fluid is flowed between the master cylinder 17 of the vehicle 10 and the brake caliper 21 of the disk brake device 20, and a hose support 50 that supports the brake hose 40. The brake hose 40 includes a first hose 41 that is disposed adjacent to the master cylinder 17 and has a first end 40a of the brake hose 40, a second hose 42 that is disposed adjacent to the brake caliper 21 and has a second end 40b of the brake hose 40, and a connecting member 43 (supporting portion 40s). In other words, the brake hose 40 has the first end 40a that is located adjacent to the master cylinder 17, the second end 40b that is located adjacent to the brake caliper 21, and the supporting portion 40s that is disposed between the first and second ends 40a, 40b.

The first hose 41 includes a rubber hose 41a and a cylindrical fitting 41b. The rubber hose 41a connects a pipe 11c, which is connected to the master cylinder 17 in the vehicle body 11, with the connecting member 43. The fitting 41b fixes the rubber hose 41a at the first end 40a of the brake hose 40. The fitting 41b is fastened with the rubber hose 41a inserted so that the rubber hose 41a is fluid-tightly fixed. The fitting 41b is supported at the first end 40a of the brake hose 40 by a support member 11b. The support member 11b has a plate shape and extends in Y-axis direction from the frame 11a of the vehicle body 11. The pipe 11c is inserted through a hole (not shown) formed through the frame 11a and extends out from the vehicle body 11.

The second hose 42 includes a rubber hose 42a that connects the connecting member 43 with the brake caliper 21 and a cylindrical fitting 42b that fixes the rubber hose 42a at the second end 40b of the brake hose 40. The fitting 42b is fastened with the rubber hose 42a inserted so that the rubber hose 42a is fluid-tightly fixed. The fitting 42b is formed on the side thereof opposite from the rubber hose 42a with a banjo portion 42c. The fitting 42b and the banjo portion 42c correspond to the second end 40b of the brake hose 40 according to the present invention.

The banjo portion 42c is connected to the introduction portion 21a of the brake caliper 21 and fixed to the brake caliper 21 by a banjo bolt (not shown). When the knuckle 30 and the brake caliper 21 are turned about the kingpin axis KP, the fitting 42b and the banjo portion 42c, or the second end 40b of the brake hose 40, moves around the kingpin axis KP.

Figure 5:
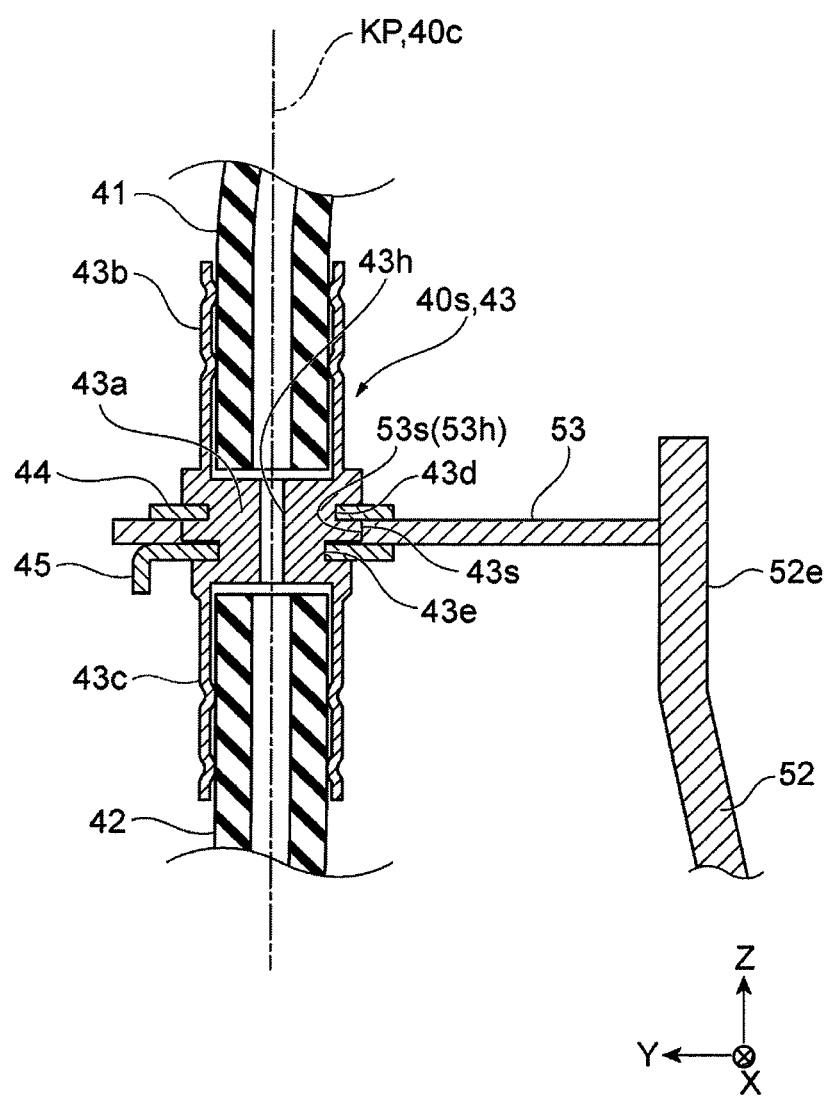
FIG. 5 is a partially enlarged view of a supporting portion.

The following will describe the connecting member 43 with reference to the FIGS. 4 and 5. The connecting member 43 has a generally cylindrical shape and is made of a metal. The connecting member 43 includes a body portion 42a and fixing portions 43b, 43c disposed along the axial direction of the connecting member 43.

The body portion 42a of the connecting member 43 is supported by the hose support 50. The body portion 42a has a generally cylindrical shape and forms the center portion of the connecting member 43. The body portion 43a has a circular hole 43h extending in the axial direction of the body portion 43a. The hole 43h provides a fluid communication between the rubber hoses 41a, 42a of the first and second hoses 41, 42, respectively.

The fixing portions 43b, 43c have a cylindrical shape and form the end portions on the opposite sides of the body portion 43a. The fixing portions 43b, 43c and the body portion 42a are formed coaxially. The fixing portion 43b is fixed fluid-tight on the rubber hose 41a of the first hose 41. The fixing portion 43c is fixed fluid-tight on the rubber hose 42a of the second hose 42.

The brake hose 40 is formed into a single hose by connecting the first and second hoses 41, 42 at the connecting member 43. The axis 40c of the brake hose 40 at the connecting member 43 coincides with the axis of the connecting member 43. In other words, the position of the connecting member 43 determines the orientation of the brake hose 40 at the connecting member 43.

The body portion 43a of the connecting member 43 has at the outer periphery thereof a pair of flat surfaces 43s extending parallel to the axis 40c of the brake hose 40. The cross-sectional shape of the part of the body portion 43a corresponding to the paired flat surfaces 43s which is taken across the axis 40c is substantially the same as that of a hole 53h of a hose support portion 53, which will be described later. The body portion 42a has in the outer periphery thereof a groove 43d formed at a position adjacent to the fixing portion 43b, extending over the entire circumference of the body portion 42a around the axis of the hole 43h. A fixing ring 44, which is formed by an E-ring or a C-ring, is fitted into the groove 43d. The body portion 42a further has at the outer periphery thereof a groove 43e disposed adjacent to the fixing portion 43c, extending over the entire circumference of the body portion 42a around the axis of the hole 43h. A fixing plate 45 having a curved surface along the fitting direction, which plate will be described later, is fitted in the groove 43d.

The following will describe the hose support 50 that supports the brake hose 40 at the connecting member 43 between the first and second ends 40a, 40b with reference to FIGS. 3 to 6. The hose support 50 includes a base 51, a body 52 and the hose support portion 53.

The base 51 of the hose support 50 is mounted to the upper surface 19d of the beam member 19 at a position that is adjacent to the one end 19a of the beam member 19. The base 51 is formed by a metal plate and has a hut shape in cross section, as shown in FIGS. 3 and 4. The base 51 has a flat upper surface 51a extending perpendicularly to the kingpin axis KP. The base 51 has a thickness between 10 mm and 20 mm. Any suitable shape of any suitable material may be used for the base 51.

The base 51 of the hose support 50 is fixed to the upper surface 19d of the beam member 19 by soldering with the upper surface 51a of the base 51 facing upward. The upper surface 51a of the base 51 extends generally parallel to the upper surface 19d of the beam member 19. Two female threaded holes 51h are formed through the base 51 and are engaged with bolts 54.

Figure 6A:
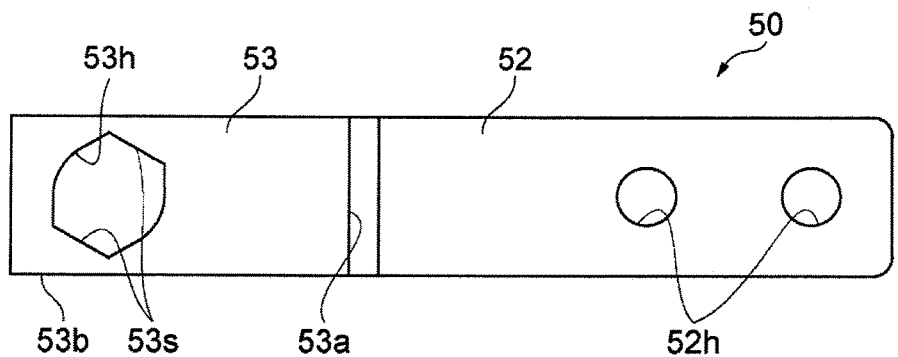
FIG. 6A and FIG. 6B are a plan view and a side view, respectively, of a hose support.
Figure 6B:
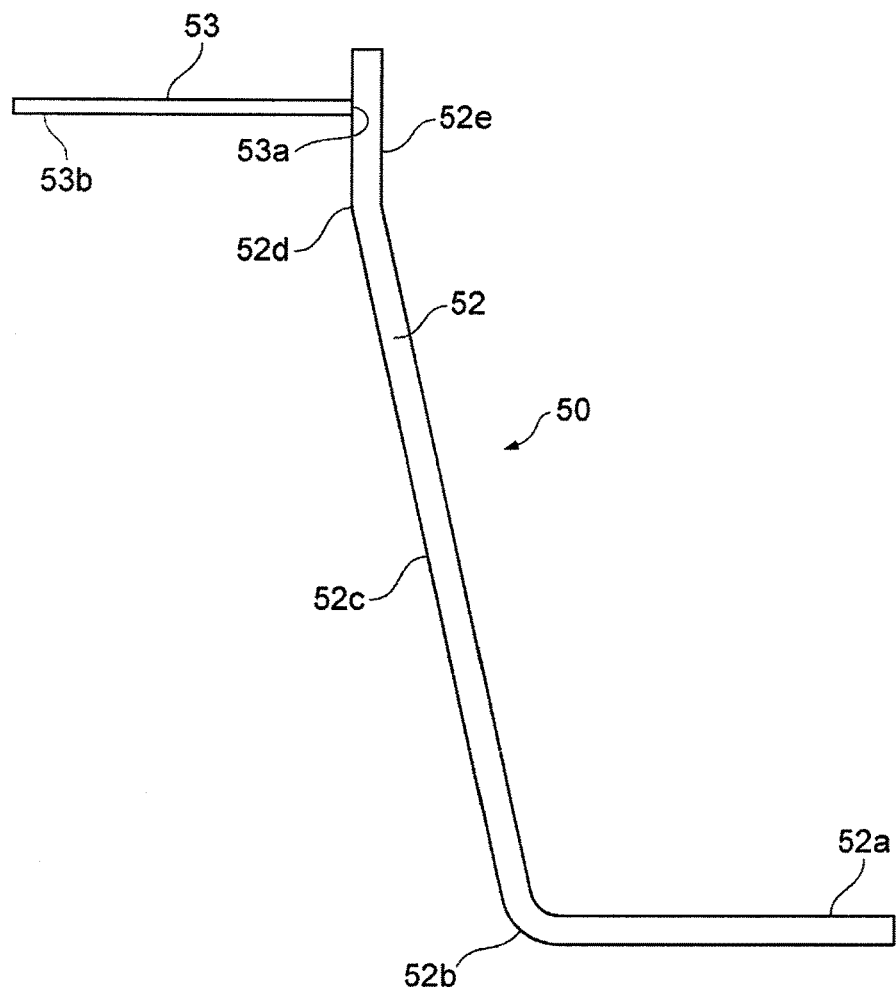

As shown in FIGS. 4, 6A and 6B, the body 52 of the hose support 50 is formed by bending a metal plate at bent portions 52b, 52d and includes a fixing portion 52a, a stand portion 52c and an upper end portion 52e. The body 52 is made of a steel and has a thickness between 4 mm and 6 mm. The body 52 need not necessarily be formed by a metal plate member, but any suitable shape such as a bar, a pipe, a square member of any suitable material may be used for the body 52 of the hose support 50.

The fixing portion 52a is fixed to the upper surface 51a of the base 51. The fixing portion 52a has a substantially the same shape, for example a rectangular shape, as the upper surface 51a of the base 51 in plan view. The fixing portion 52a has therethrough two holes 52h and is fixed to the base 51 with the bolts 54 that are inserted through the holes 52h and screwed in the threaded holes 51h. It is to be noted that any number of holes such as 52h may be formed through the fixing portion 52a.

The stand portion 52c extends upwardly from the fixing portion 52a with such an inclination that the spaced distance from the stand portion 52c to the kingpin axis KP is decreased toward the upper end of the stand portion 52c. With the body 52 of the hose support 50 fixed to the beam member 19 by way of the base 51, the upper end portion 52e extends upward from the bent portion 52d perpendicularly to the fixing portion 52a, as shown in FIGS. 4 and 6B. Specifically, the upper end portion 52e extends in vertical Z-axis direction that is generally parallel to the kingpin axis KP.

The hose support portion 53 is configured to support the connecting member 43 of the brake hose 40. The hose support portion 53 has a rectangular plate shape having a width that is substantially the same as the body 52 of the hose support 50. The hose support portion 53 has a proximal end 53a that is fixed to the upper end portion 52e of the body 52 by soldering or any suitable method. The hose support portion 53 may be fastened to the body 52 by a bolt.

The hose support portion 53 extends in a direction that is generally perpendicular to the upper end portion 52e and to the kingpin axis KP. Specifically, the hose support portion 53 extends generally parallel to the fixing portion 52a of the body 52, or to the upper surface 51a of the base 51. Thus, the hose support portion 53 extends generally perpendicularly to the kingpin axis KP.

Referring to FIG. 6A, the hose support portion 53 of the hose support 50 includes a distal end 53b having the hole 53h through which the connecting member 43 of the brake hose 40 is inserted. The axis of the hole 53h coincides with the kingpin axis KP. A pair of flat surfaces 53s are formed in the inner surface of the hole 53h. As indicated earlier, the part of the body portion 42a of the connecting member 43 corresponding to the flat surfaces 53s of the hole 53h has a shape substantially the same as the hole 53h of the hose support portion 53 in cross section perpendicular to the axis of the connecting member 43. The flat surfaces 53s are formed at positions corresponding to the flat surfaces 43s of the body portion 42a of the connecting member 43, and the body portion 42a of the connecting member 43 is inserted through the hole 53h of the hose support portion 53. In the present embodiment, the paired flat surfaces 53s of the hose support portion 53 are formed extending parallel to each other and the same is true for paired flat surfaces 43s of the connecting member 43. Because the flat surfaces 53s of the hose support portion 53 are set in contact when the body portion 42a of the connecting member 43 is inserted through the hole 53h, the rotation of the body portion 42a about the axis 40c of the brake hose 40 is prevented. In other words, the flat surfaces 53s of the hose support portion 53 and the flat surfaces 43s of the connecting member 43 cooperate to fix the body portion 42a relative to the axis 40c of the brake hose 40 and prevent the rotation of the body portion 43a. The body portion 42a of the connecting member 43 is fixed at a position where twisting force applied to the brake hose 40 is minimized. More specifically, the paired flat surfaces 53s are formed at such positions in the hole 53h of the hose support portion 53 that the twisting force applied to the second hose 42 is minimized when the second end 40b of the brake hose 40 is positioned at the middle point M.

The thickness of the hose support portion 53 is substantially the same as the spaced distance between the groove 43d and the groove 43e, about 2 mm and 3 mm. The hose support portion 53 is formed by a steel plate. Any shape (e.g. bar, pipe and square column) of any material may be used for the hose support portion 53 as long as it can support the connecting member 43 of the brake hose 40.

The position of the hose support portion 53 where the connecting member 43 is supported by the hose support portion 53 in the vertical direction, or Z-axis direction, is determined depending on the spaced distance between the connecting member 43 and the second end 40b of the brake hose 40, which spaced distance corresponds to the dimension from an imaginary plane extending perpendicularly to the kingpin axis KP at the second end 40b to the connecting member 43. Such dimension is set based on the allowable bending deformation of the second hose 42 which is determined by the durability of the second hose 42. The allowable bending deformation may be calculated using simulations.

In this brake hose support structure 1, the brake hose 40 is supported by the hose support 50 at the connecting member 43. According to the present invention, the connecting member 43 corresponds to the supporting portion 40s of the brake hose 40.

The fixing ring 44 and the fixing plate 45 are fitted into the groove 43d and the groove 43e in the upper part and lower part of the hose support portion 53, respectively, with the connecting member 43 inserted through the hole 53h of the hose support portion 53. The hose support portion 53 is held between the fixing ring 44 and the fixing plate 45, so that the movement of the body portion 43a of the connecting member 43 in the axial direction of the hole 43h is prevented thereby to position the body portion 42a at the hose support portion 53. In addition, the paired flat surfaces 53s formed in the inner periphery of the hole 53h prevents the rotation of the connecting member 43 about the axis of the hole 43h thereof, or the axis 40c of the brake hose 40. Accordingly, the connecting member 43 is fixed to the hose support portion 53.

With the connecting member 43 of the brake hose 40 supported by the hose support portion 53, the axis 40c of the brake hose 40 at the connecting member 43 extends perpendicular to the upper surface 19d of the beam member 19 at one end 19a thereof. In other words, the hose support 50 supports the brake hose 40 such that the axis 40c of the brake hose 40 extends parallel to the kingpin axis KP. In the present embodiment, the axis 40c of the brake hose 40 at the connecting member 43 coincides with the kingpin axis KP.

The following will describe bending of the brake hose 40 when the front wheel 12 is steered in either direction with reference to FIGS. 7 to 9.

Figure 9A:
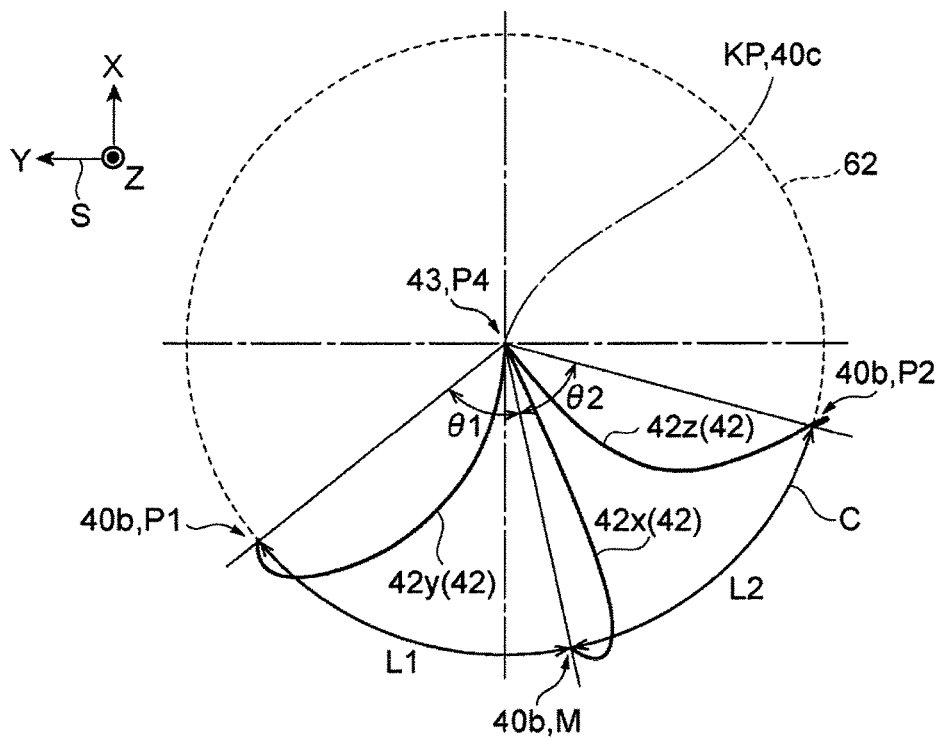
FIGS. 9A and 9B are a plan view and a side view, respectively, of an imaginary cone describing the movement of a second end of the brake hose.
Figure 9B:
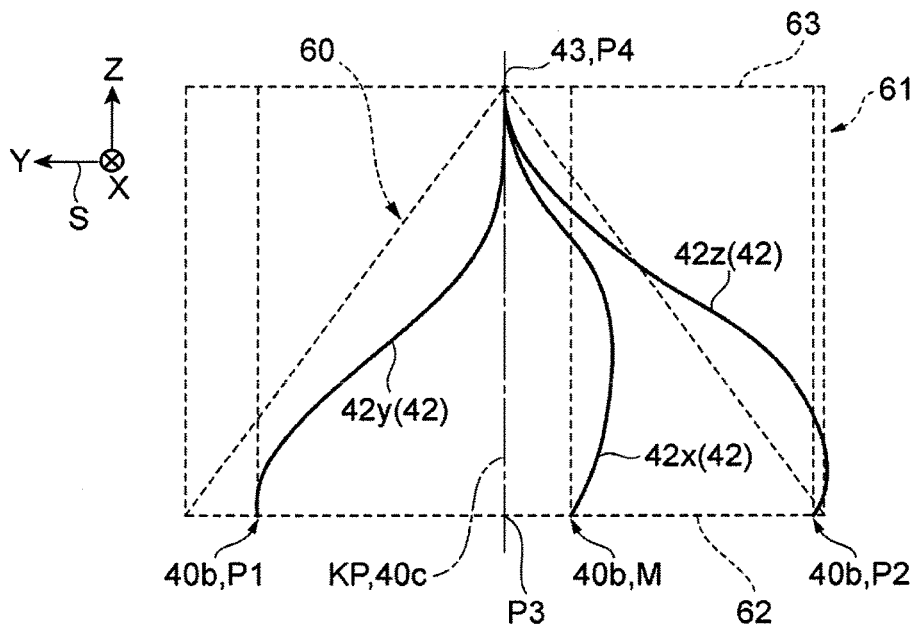

As has been described, the knuckle 30 and kingpin 31 are integrally rotatable about the kingpin axis KP. When the front wheel 12 is steered, the brake caliper 21 fixed to the knuckle 30 and the second end 40b of the brake hose 40 fixed to the introduction portion 21a of the brake caliper 21 are rotated integrally about the kingpin axis KP. Referring to FIGS. 9A and 9B, there is shown an imaginary cone 60 which illustrates the movement of the second end 40b of the brake hose 40.

The imaginary cone 60 has an apex at the point P4 and a circular bottom plane 62 extending parallel to the flat surface XY. The point P3 indicates the center of the bottom plane 62. The point P4 corresponds to the position of the connecting member 43. The circumference of the bottom plane 62 corresponds to the circumference of a circle having its center at the kingpin axis KP and a radius corresponding the distance from the axis KP to the second end 40b of the brake hose 40. An imaginary line passing through the point P4 and expending perpendicular to the bottom plane 62 coincides with the axis 40c of the brake hose 40 at the connecting member 43.

The second end 40b of the brake hose 40 is movable along the arc C of the circumference of the bottom plane 62. In other words, the second end 40b of the brake hose 40 is movable along the arc C having a center of curvature at the kingpin axis KP. Referring to FIG. 9A, P1 and P2 indicates first and second points which correspond to the opposite ends of the arc C in the imaginary cone 60. Referring to FIGS. 7 and 8, the first and second points P1, P2 correspond to the positions of the second end 40b when the front wheel 12 is turned to its steering limit positions in clockwise and counterclockwise directions as seen from the top, respectively. The middle point M on the arc C, which will be described later, corresponds to the position where the distances from the first point P1 and the second point P2 to the middle point M are substantially the same. The curved line 42x indicates the position of the second hose 42 when the second end 40b is located at the middle point M. The curved lines 42y, 42z indicate the positions of the second hose 42 when the second end 40b is located at the first and second points P1, P2, respectively. When the second end 40b moved from the middle point M along the arc C to the first or second points P1, P2, the position of the second hose 42 is moved from the curved line 42x to the curved line 42y or 42z, respectively. The curved lines 42y, 42z have a substantially the same shape as the curved line 42x.

As shown in FIGS. 9A and 9B, the second end 40b of the brake hose 40 is movable within the arc C of the circumference of the bottom plane 62. Because the axis 40c of the brake hose 40 at the connecting member 43 coincides with the kingpin axis KP, the position of the second end 40b of the brake hose 40 is not greatly displaced relative to the imaginary line extending through the point P4 and perpendicularly to the bottom plane 62 regardless of the movement of the second end 40b along the arc C. In the brake hose support structure 1, therefore, the position of the second end 40b of the brake hose 40 is not greatly displaced relative to the axis 40c of the brake hose 40 at the connecting member 43 by the movement of the second end 40b around the kingpin axis KP with the steering movement of the front wheel 12.

If the axis 40c of the brake hose 40 at the connecting member 43 extends across the kingpin axis KP as in the case of the prior art, localized bending may occur in the second hose 42 at the connecting member 43 when the front wheel 12 is steered. According to the brake hose support structure 1 of the present embodiment, the above-described positional relationship between the axis 40c of the brake hose 40 at the connecting member 43 and the second end 40b of the brake hose 40 restricts the localized bending of the second hose 42 of the brake hose 40 which may occur with the steering of the front wheel 12.

The above-described brake hose support structure 1 prevents the displacement of the second end 40b relative to the axis 40c of the brake hose 40 at the connecting member 43 when the second end 40b of the brake hose 40 is moved about the kingpin axis KP with the steering movement of the front wheel 12. Thus, the bending deformation of the brake hose 40 with the steering movement of the front wheel 12 may be prevented.

In the brake hose support structure 1, the axis 40c of the brake hose 40 coincides with the kingpin axis KP. Referring to the imaginary cone 60, which has been discussed with reference to FIGS. 9A and 9B, the line which corresponds to the axis of the brake hose 40 and also to the kingpin axis KP extends from the point P4 which corresponds to the connecting member 43 perpendicularly to the point P3 at the center of the bottom plane 62. Thus, the imaginary cone 60 has a right circular cone shape. In such imaginary cone 60, the angular position of the second end 40b of the brake hose 40 relative to the perpendicular line, or the axis of the brake hose 40, hardly changes irrespective of the movement of the second end 40b of the brake hose 40 along the arc C in the imaginary cone 60. Accordingly, the angular position of the second end 40b at the connecting member 43 (supporting portion 40s) relative to the axis 40c hardly changes when the second end 40b of the brake hose 40 is turned about the kingpin axis KP with the steering movement of the front wheel 12. Comparing bending of the brake hose 40 at various steering angles, the difference in the degree of bending of the brake hose 40 caused by the steering movement of the front wheel 12 may be restricted to a small extent.

Figure 10:
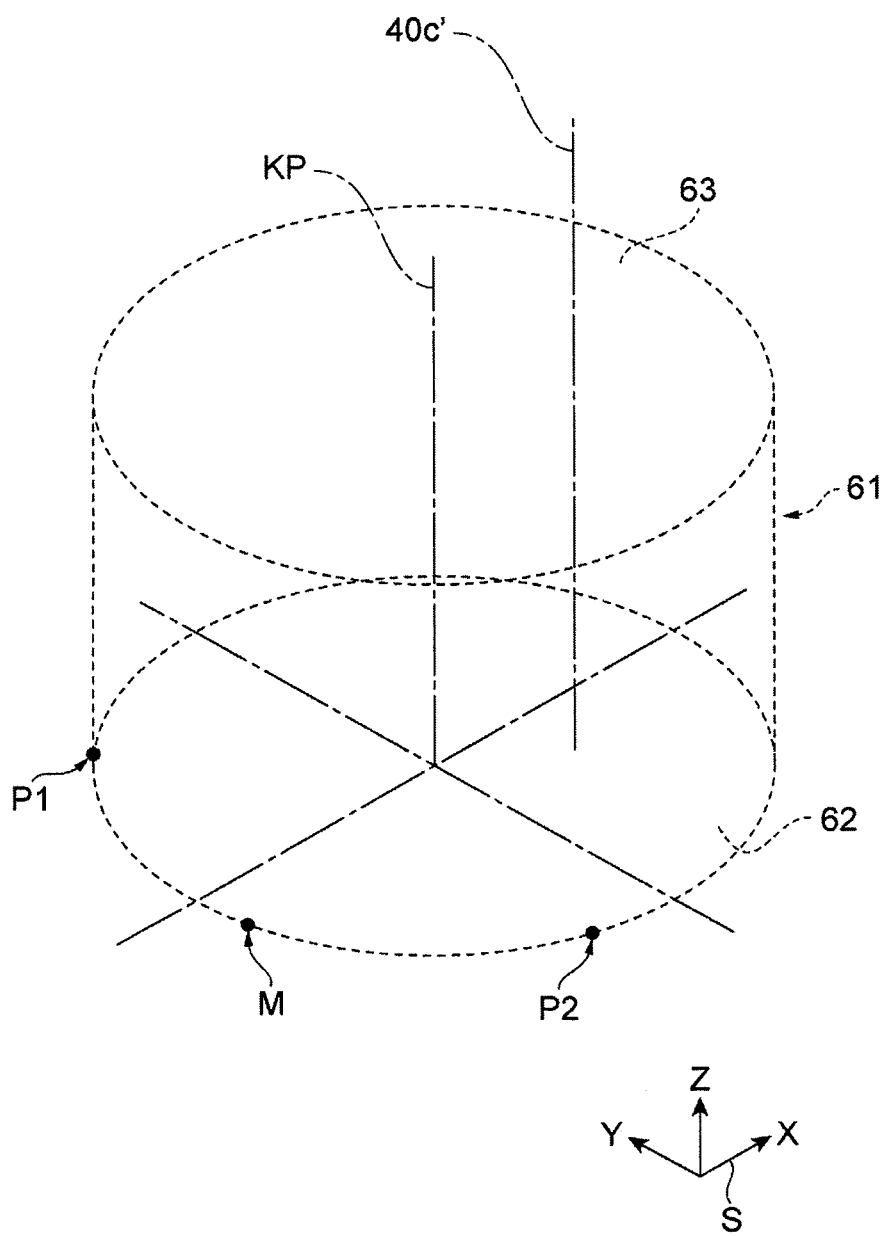
FIG. 10 is a perspective view of an imaginary circular column describing an example of the axis of the brake hose at a supporting portion is described.

It is noted that the axis 40c of the brake hose 40 at the connecting member 43 need not necessarily coincide with the kingpin axis KP, as long as the supporting portion 40s, or the connecting member 43, of the brake hose 40 is supported by the hose support 50 such that the axis 40c of the brake hose 40 extends parallel to the kingpin axis KP. For example, the axis of the brake hose 40 at the connecting member 43 may be set at 40c' extending parallel to the kingpin axis KP passing through an imaginary circular column 61, as shown in FIG. 10. The imaginary circular column 61 has an upper plane 63 that has substantially the same shape as and coaxially with the bottom plane 62 of the imaginary cone 60. The position of the second end 40b of the brake hose 40 relative to the axis 40c' is not greatly displaced regardless of the movement of the second end 40b along the arc C of the imaginary circular column 61. When the second end 40b is moved about the kingpin axis KP with the steering movement of the front wheel 12, the position of the second end 40b relative to the axis 40c' of the brake hose 40 at the connecting member 43 is not greatly displaced, with the result that bending of the brake hose 40 with the steering movement of the front wheel 12 may be prevented.

In the brake hose support structure 1, the set position of the second end 40b is set at the middle point M between the first and second points P1, P2 in the imaginary cone 60. The set position of the second end 40b is located at a position along the arc C at which the second end 40b of the brake hose 40 is mounted to the introduction portion 21a of the brake caliper 21. In other words, the second end 40b of the brake hose 40 is mounted to the introduction portion 21a of the brake caliper 21 so that the distance L1 from the first point P1 to the set position is substantially the same as the distance L2 from the second point P2 to the set position.

Thus, the central angle θ1, which is formed by the movement of the second end 40b from the set position to the first point P1 along the arc C, is substantially the same as the central angle θ2, which is formed by the movement of the second end 40b from the set position to the second point P2. If the set position for the second end 40b is offset from the middle point M, one of the central angles θ1, θ2 becomes greater than the other. By setting the set position of the second end 40b at the middle point M between the first and second points P1, P2 along the arc C, twisting of the second hose 42 is reduced, as a result of which the serviceable life of the brake hose 40 may be increased. In the present embodiment, the angular position of the body portion 42a with respect to the axis 40c when the body portion 42a is inserted through the hole 53h of the hose support portion 53 and fixed is set so that twisting force applied to the second hose 42 is minimized when the second end 40b of the brake hose 40 is located at the middle point M, with the result that the deformation caused by twisting may be reduced. According to the present embodiment, the steering limit angle of the front wheel 12 in one direction differs from that in the other direction as shown in FIGS. 7 and 8. In this case, the position of the second end 40b when the front wheel 12 is positioned for straight-forward movement do not coincide with the middle point M.

The present invention is not limited to the above-described embodiment, but it may be modified in various manners within the scope of the present invention. In addition, the brake hose support structure 1 of the present invention is applicable to any other vehicles than the towing tractor.

In the brake hose support structure 1, the brake hose 40 may be supported rotatably about the axis 40c of the brake hose 40 at the connecting member 43, or at the supporting portion 40s of the brake hose 40. For example, the hole 53h of the hose support portion 53 may have a circular shape in cross section so as not to restrict the rotation of the body portion 42a of the connecting member 43 at the hole 43h. Alternatively, the supporting portion 40s of the brake hose 40 may be supported rotatably about the axis 40c through a bearing. In this case, twisting of the brake hose 40 occurs between the first end 40a and the second end 40b with the steering movement of the front wheel 12. Stress caused by twisting is received by the entire brake hose 40, that is, not only by the second hose 42 but also by the first hose 41. Such configuration of the brake hose support structure 1 prevents localized fatigue of the brake hose 40, so that the serviceable life of the brake hose 40 may be increased.

The brake hose 40, which is formed by the first and second hoses 41, 42 connected by the connecting member 43, may be replaced with a brake hose formed by a single rubber hose. In this case, the brake hose is supported by the hose support 50 without the connecting member 43.

Although the connecting member 43 corresponds to the supporting portion 40s of the brake hose 40 according to the present embodiment, any other part of the brake hose 40 other than that corresponding to the connecting member 43 may be used as the position at which the brake hose 40 is supported.

The hose support 50 may have any suitable configuration as long as it supports the brake hose 40 with the axis 40c thereof extending parallel to the kingpin axis KP.

The kingpin axis KP need not necessarily extend in the X-axis direction. For example, the kingpin axis KP may be inclined with respect to the Z-axis direction in a plane extending parallel to the plane ZX. In this case, the connecting member 43 is supported by the hose support 50 in a position inclined in the direction in which the kingpin axis KP is inclined, so that the brake hose 40 is disposed with axis 40c thereof extending parallel to the kingpin axis KP at the connecting member 43. Because the brake hose 40 is supported by the hose support 50 in a such position that the axis 40c of the brake hose 40 extends parallel to the kingpin axis KP, the above-described effects described with reference to the embodiment may be achieved.

The brake hose support structure 1 is applicable to the rear wheel 13 of the vehicle 10 if it is configured to be steerable with the operation of the steering device 15 and provided with the disk brake device 20.

What is claimed is:

1. A brake hose support structure of a vehicle comprising:
   a brake hose through which pressure fluid is flowed between a pressure source mounted to the vehicle and a brake caliper of a disk brake device of the vehicle; and
   a hose support supporting the brake hose,
   wherein the brake hose has a first end that is located adjacent to the pressure source, a second end that is located adjacent to the brake caliper, and a supporting portion that is disposed between the first and second ends, the hose support supports the brake hose at the supporting portion such that an axis of the brake hose at the supporting portion extends parallel to a kingpin axis, and the axis of the brake hose at the supporting portion coincides with the kingpin axis.

2. The brake hose support structure according to claim 1, wherein the brake hose is supported rotatably about the axis of the brake hose at the supporting portion.

3. A brake hose support structure of a vehicle comprising:
a brake hose through which pressure fluid is flowed between a pressure source mounted to the vehicle and a brake caliper of a disk brake device of the vehicle; and
a hose support supporting the brake hose,
wherein the brake hose has a first end that is located adjacent to the pressure source, a second end that is located adjacent to the brake caliper, and a supporting portion that is disposed between the first and second ends, the hose support supports the brake hose at the supporting portion such that an axis of the brake hose at the supporting portion extends parallel to a kingpin axis, wherein the second end of the brake hose is movable along an arc having a center of curvature at the kingpin axis, wherein the arc includes first and second points that correspond to the positions of the second end of the brake hose when a wheel of the vehicle is turned to steering limit positions in clockwise and counterclockwise directions, respectively, and a set position of the second end is located at a middle point on the arc between the first and second points.

4. The brake hose support structure according to claim 3, wherein the brake hose is supported rotatably about the axis of the brake hose at the supporting portion.

\* \* \* \* \*